UNITED STATES PATENT OFFICE.

ERNST BERL, OF TUBIZE, BELGIUM.

PROCESS FOR PREPARING SOLUTIONS OF CELLULOSE AND FOR THE PRODUCTION OF CELLULOSE PRODUCTS FROM SUCH SOLUTIONS.

1,082,490.

Specification of Letters Patent.  Patented Dec. 30, 1913.

No Drawing.   Application filed June 3, 1913. Serial No. 771,492.

*To all whom it may concern:*

Be it known that I, ERNST BERL, a subject of the Emperor of Austria-Hungary, residing at Tubize, in the Kingdom of Belgium, have invented certain new and useful improvements in the process for preparing solutions of cellulose and for the production of cellulose products from such solutions, of which the following is a specification.

My invention relates to an improved process for preparing solutions of cellulose with sulfuric acid and for the production of cellulose products from such solutions.

It is known that concentrated sulfuric acid of certain strengths is capable of exerting a swelling or solvent action on cellulose and its closely allied products, hereinafter called cellulosic materials. This property has been turned to use in the manufacture of parchment, in acid mercerizing and so forth. Langhans (German Patent 72,572) attempted to make use of the solvent action of sulfuric acid on cellulose for preparing substances capable of spinning and squirting. By working according to the instructions of this patent a substance is obtained which readily becomes fluid, in which liquid large quantities of unattacked cellulose are found. It is therefore very difficult to filter such products. If the coagulation be undertaken with water as stated in this patent then products of small stability are obtained. On the other hand according to my invention valuable spongy masses and solutions can be obtained when using cellulose or its closely allied derivatives for the manufacture of artificial threads, tulle, films and plastic masses, if the temperature be kept continuously very low and concentrated sulfuric acid of certain strength (60–77% $H_2SO_4$) be employed when making the spongy mass. Under these conditions the decomposing and dehydrating action of the sulfuric acid on the cellulose is restricted to a practically harmless degree. Naturally this advantageous influence of low temperature must be maintained during the process of coagulation. Otherwise the decomposing action of the sulfuric acid predominates, resulting in the prepared products lacking in stability. It has been proved that the coagulation temperature must be nearly the same as or lower than the temperature for producing the spongy mass to obtain products of value. Consequently such substances for producing coagulation are necessary as can be cooled to the required low temperature minimum $-10°$ C. or lower). The following proved suitable— the aliphatic alcohols such as methyl and ethyl alcohol and their aqueous solutions, solutions of sulfates (such as ammonium sulfate), of phosphates, and dilute sulfuric acid, the melting points of which are not above $-10°$ C.

Example I: One part of cooled, dried and very finely divided cotton is digested in a kneading machine with 12 parts sulfuric acid of 74% $H_2SO_4$ at a temperature of about $-15°$ C. and then left standing for some time. A viscous mass is obtained from which the confined air can be exhausted *in vacuo*. After filtering coagulation is caused by immersion in 50% alcohol cooled to $-20°$ C.

Example II: One part mercerized cotton is thoroughly intermixed with 12 parts sulfuric acid of 70% in a kneading machine at a temperature not exceeding $-15°$ C. till it has swollen up to a viscous mass. Coagulation is obtained by a very strongly cooled aqueous solution of methyl alcohol.

Example III: Hydrocellulose is digested with sulfuric acid as described in Examples I and II till a homogeneous viscous mass is obtained; coagulation is brought about by 25% sulfuric acid cooled almost to its freezing point.

Example IV: Finely divided carefully dried wood cellulose is likewise digested with strongly cooled 65% sulfuric acid till a homogeneous mass is obtained and is coagulated by a solution of ammonium sulfate cooled to $-18°$ C.

Example V: Wastes of artificial silk are placed in sulfuric acid of 60% cooled to a temperature of about $-10$ to $-15°$ C. and are then digested at said low temperature till a homogeneous mass is obtained; the coagulation is then obtained according to one of the already stated methods.

What I claim is:

1. A process for producing solutions of cellulose said process consisting in treating a cellulose-containing material with sulfuric acid at a temperature not exceeding $-10°$ C.

2. A process for producing solutions of cellulose, said process consisting in treating a cellulose-containing material with sulfuric acid of 60-77% $H_2SO_4$ at a temperature not exceeding $-10°$ C.

3. A process for producing solutions of cellulose and obtaining cellulose products from such solutions, said process consisting in treating a cellulose-containing material with sulfuric acid of 60-77% $H_2SO_4$ at a temperature not exceeding $-10°$ C. and then coagulating the solution.

4. A process for producing solutions of cellulose and obtaining cellulose products from such solutions, said process consisting in treating a cellulose-containing material with sulfuric acid of 60-77% $H_2SO_4$ at a temperature not exceeding $-10°$ C. and then subjecting the solution to the action of a coagulating liquid at a temperature not exceeding $-10°$ C.

5. A process for converting cellulosic material into a form suitable for the manufacture of artificial silk, tulle, films and the like, said process consisting in treating the cellulosic material with sulfuric acid of 60-77% $H_2SO_4$ at a temperature not exceeding $-10°$ C. and then coagulating the solution while maintaining said low temperature.

6. A process for converting cellulosic material into a form suitable for the manufacture of artificial silk, tulle, films and the like said process consisting in digesting the cellulosic material with sulfuric acid of 60-77% $H_2SO_4$ at a temperature not exceeding $-10°$ C. and then treating the solution with a coagulating agent adapted to be cooled to a temperature not exceeding $-10°$ C., whereby the solution of cellulose is caused to coagulate.

7. A process for producing solutions of cellulose, consisting in treating a cellulose-containing material with a solvent at a temperature not above $-10°$ C., said solvent normally dehydrating cellulose.

8. A process for producing solutions of cellulose, consisting in treating a cellulose-containing material with sulfuric acid at a temperature at which the dehydrating action of sulfuric acid on cellulose is practically *nil*.

9. A process for producing solutions of cellulose, consisting in treating a cellulose-containing material with a solvent which normally dehydrates cellulose at a temperature at which substantially no dehydration of the cellulose takes place.

In testimony whereof I have affixed my signature in presence of two witnesses.

ERNST BERL.

Witnesses:
 JACQUES BEDE,
 C. R. NASMITLE.